United States Patent

Kuribayashi et al.

[11] 4,311,013
[45] Jan. 19, 1982

[54] METHOD OF CONTROLLING CONDENSATION SYSTEM OF STEAM PLANT

[75] Inventors: Tetsuzo Kuribayashi; Hiroshi Tsunematsu, both of Hitachi, Japan

[73] Assignee: Hitachi, Ltd., Tokyo, Japan

[21] Appl. No.: 124,960

[22] Filed: Feb. 26, 1980

[30] Foreign Application Priority Data

Feb. 27, 1979 [JP] Japan .................. 54/23881

[51] Int. Cl.$^3$ .......................................... F01K 13/02
[52] U.S. Cl. ...................................... 60/646; 60/657; 122/406 ST
[58] Field of Search ............... 60/646, 656, 657, 665, 60/667; 122/406 ST

[56] References Cited

U.S. PATENT DOCUMENTS

| | | | |
|---|---|---|---|
| 3,243,961 | 4/1966 | Caracristi | 122/406 ST |
| 3,271,961 | 9/1966 | Wiener | 122/406 ST |
| 3,361,117 | 1/1968 | Batyko | 122/406 ST |
| 4,130,992 | 12/1978 | Bitterlich et al. | 60/646 X |

*Primary Examiner*—Allen M. Ostrager
*Assistant Examiner*—Stephen F. Husar
*Attorney, Agent, or Firm*—Craig and Antonelli

[57] ABSTRACT

In starting a steam turbine plant of a combined plant including a gas turbine plant in addition to the steam turbine plant, a condensation system is controlled in such a manner that water retained in a deaerated water tank used in the steam turbine plant is fed to a gas turbine waste heat recovery boiler at steam turbine plant start-up, and the condensate recovered from the boiler is stored in a condenser and a condensate tank. Feeding of water from the condenser to a deaerator is initiated when the deaerator functions satisfactorily by using as a heat source the water at the outlet of a fuel economizer of the boiler.

4 Claims, 5 Drawing Figures

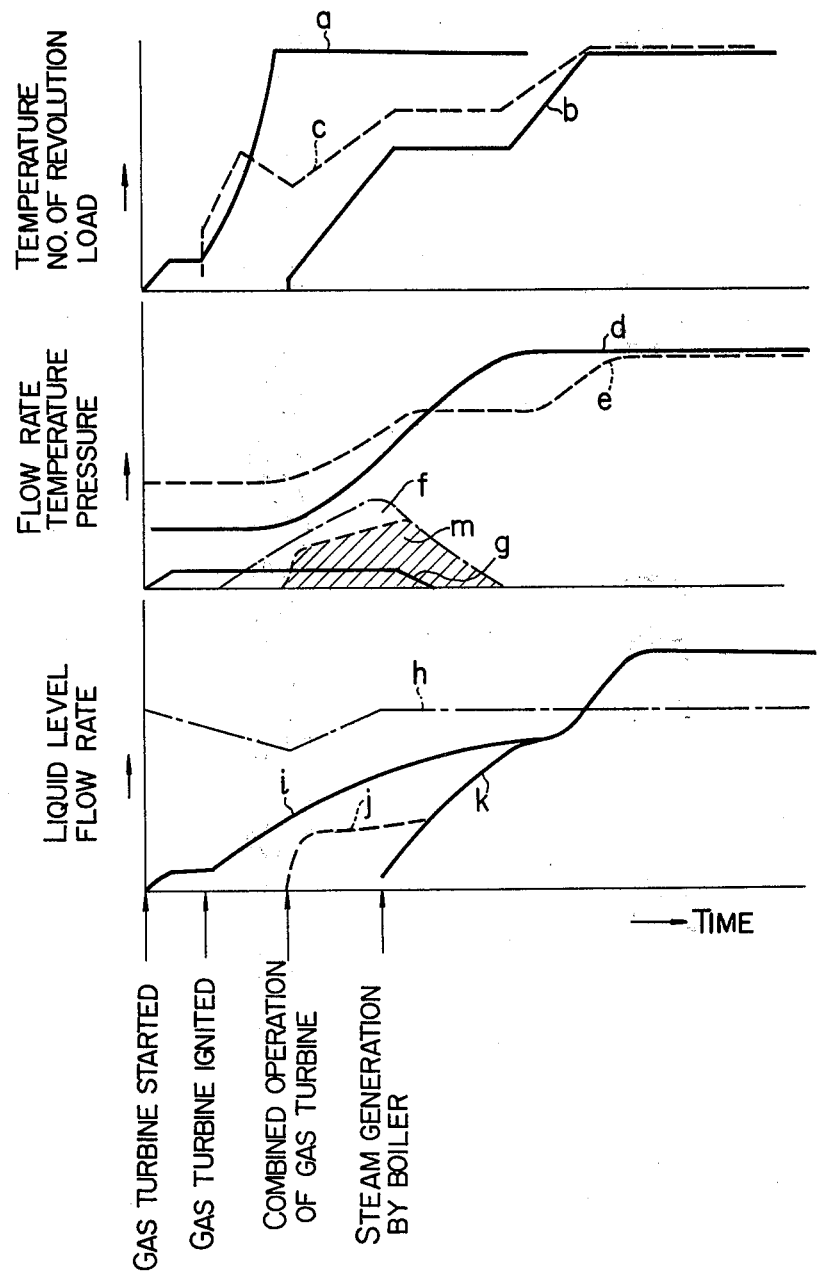

METHOD OF CONTROLLING CONDENSATION SYSTEM OF STEAM PLANT

BACKGROUND OF THE INVENTION

This invention relates to methods of controlling the condensation system of a steam plant, and more particularly it is concerned with a method of controlling a condensation system suitable for use with a daily start-stop plant.

A combined plant including in combination a gas turbine and a steam turbine is suitable as a daily start-stop plant, because this type of plant has good start-up characteristics due to the facts that the gas turbine lends itself to quick start-up and the steam turbine is in low-pressure and low-temperature steam condition (about 50–80 kg/cm$^2$g and 450°–500° C.). Also, in some applications, a steam plant generally referred to as an intermediate load fossil-fuel plant, which is not a combined plant, is provided, with a view to compensating for the difference in the need for electricity between daytime and nighttime.

It is well known that when the boiler feed water is high in oxygen content, the boiler tubes of a steam plant tend to be quickly corroded. To avoid this trouble, it has hitherto been customary to mount a deaerator, such as the one described in U.S. Pat. No. 3,820,333, in the condensation system, so that the condensate supplied to the deaerator during operation of the plant at load can be heated by the steam extracted from the steam turbine and deaerated, to reduce the oxygen content of feed water to the boiler to a level below 7 ppm, for example.

Also, to minimize the oxygen content of boiler feed water at plant start-up, it is practiced to seal in the plant deaerated water that has been deaerated by the residual steam in the boiler drum during operation of the plant at load when the plant is shut down for a day or two, and to use steam from some other unit or an auxiliary boiler to heat and deaerate the condensate flowing into the deaerator at plant start-up until the steam generated by its own boiler can be used for heating and deaerating the condensate flowing into the deaerator.

In the case of a daily start-stop plant, however, all the units of the power generating plant in one locality are shut down in many cases, and the auxiliary steam is unable to be readily available from some other unit. The use of an auxiliary boiler entails an increase in capital investments and has the disadvantage that the auxiliary boiler must be run every day before plant start-up.

SUMMARY OF THE INVENTION

This invention has as its object the provision of a method for preventing corrosion of the boiler tubes of a daily start-stop plant whereby boiler feed water of low oxygen content can be supplied to the boiler without requiring the help of steam from other unit or an auxiliary boiler.

The outstanding characteristic of the invention is that at the time a plant is started up, no condensate is supplied to its deaerator until the latter becomes able to function with the steam or hot water produced by the plant's own boiler, and during this time the water held in the storage tank of the deaerator is used as boiler feed water.

BRIEF DESCRIPTION OF THE DRAWINGS

FIG. 5 is a diagram of the plant start-up characteristics of the control method according to the invention.

DESCRIPTION OF THE PREFERRED EMBODIMENT

Figure 1:
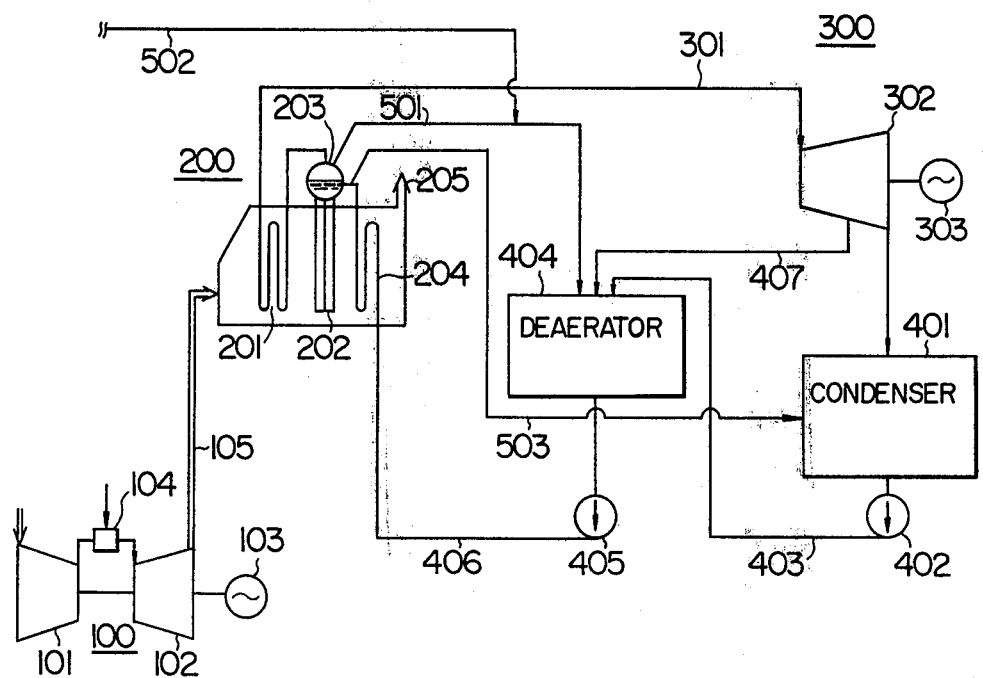
FIG. 1 is a system diagram of a combined plant of the usual type including a gas turbine and a steam turbine in combination.

FIG. 1 shows the system of a combined plant of the usual type including a gas turbine and a steam turbine suitable for applying the present invention. As shown, a gas turbine generating unit 100 comprises an air compressor 101, a gas turbine 102, a combustor 104 for combusting gas blown into the air pressurized by the air compressor 101 for generating combustion gas for driving the gas turbine 102, and a generator 103 driven by the gas turbine 102. Exhausts from the gas turbine 102 are led via a duct 105 to a boiler 200 and vented to the atmosphere through a stack 205 after the heat of the exhausts is recovered. In the boiler 200, a superheater 201, an evaporator 202, a drum 203 and a fuel economizer 204 are arranged in the indicated order from the upstream side to the downstream side of the flow of the exhausts of gas turbine therein. Boiler feed water fed from a deaerator 404 to the boiler 200 is heated by the fuel economizer 204 and then vaporized by the evaporator 202 and drum 203, and the steam obtained is supplied to a steam turbine 302 for driving same after being superheated by the superheater 201.

A steam turbine generating unit 300 comprises a main steam conduit 301 for introducing steam from the superheat 201 of the boiler 200 to the steam turbine 302, a generator 303 driven by the steam turbine 302, and a condenser 401 for condensing the steam that has done work at the steam turbine 303. Condensate in the condenser 401 is supplied via a condensate conduit 403 and a feed water conduit 406 to the fuel economizer 204 of boiler 200 by means of a condensate pump 402 mounted in the condensate conduit 403 and a feed water pump 405 mounted in the feed water conduit 406. Connected to the condensate conduit 403 is the deaerator 404 which also receives a supply of extracted steam from the steam turbine 302 via an extracted steam conduit 407, to heat and deaerate the feed water fed to the fuel economizer 204 of boiler 200.

An auxiliary steam conduit 501 is provided for feeding to the deaerator 404 from the drum 203 of boiler 200 stream remaining in the boiler 200 when the plant is shut down or steam generated in the boiler 200 at plant start-up. In addition, an auxiliary steam conduit 502 from other unit (or an auxiliary steam conduit from an auxiliary boiler, not shown) is connected to the auxiliary steam conduit 501 to heat the deaerator 404 until steam is generated by the boiler 200 at plant start-up.

A fuel economizer water blowoff line 503 connects the boiler 200 to the condenser 401 to exhaust water at the outlet of fuel economizer 204 to the condenser 401 to avoid steaming occurring as a result of vaporization of such water at plant start-up or during plant operation at low load.

Figure 2:
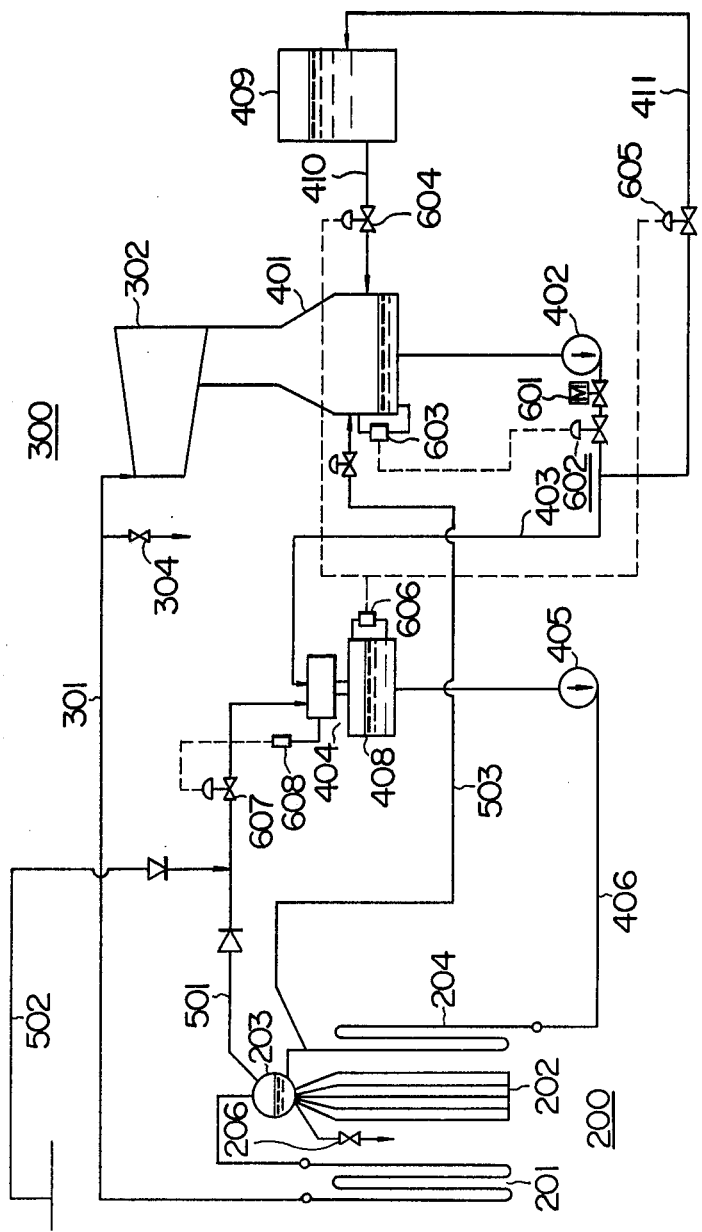
FIG. 2 is a systematic diagram of the control system of the prior art used for the combined plant shown in FIG. 1.

FIG. 2 shows a control system of the prior art for the condenser liquid level, deaerator liquid level and deaerator pressure for the combined plant system shown in FIG. 1.

Control of the condenser liquid level is effected such that a condenser liquid level detector 603 detects the liquid level in the condenser 401 and generates a control signal for adjusting the opening of a condenser liquid level control valve 602 mounted in the condensate conduit 403, to control the amount of condensate supplied by the condensate pump 402 to the deaerator 404 to keep the condenser liquid level constant. A condenser liquid level control front valve 601 located in front of the condenser liquid level control valve 602 is fully closed during plant shutdown.

Deaerator liquid level control is effected such that a deaerator liquid level detector 606 detects the liquid level in the deaerator 404 and generates a control signal for adjusting the openings of a deaerator low liquid level control valve 604 mounted in a make-up water conduit 410 connecting a condensate tank 409 to the condenser 401 and a deaerator high liquid level control valve 605 mounted in a spill-over conduit 411 connecting the condensate conduit 403 to the condensate tank 409, to control the amount of condensate inflow to the deaerator 404 to control the deaerator liquid level. A reduction in the deaerator liquid level opens the deaerator low liquid level control valve 604 to feed make-up water from the condensate tank 409 to the condenser 401. This raises the condenser liquid level and increases the opening of the condenser liquid level control valve 602 to increase the condensate inflow to the deaerator 404. Conversely, a rise in the deaerator liquid level opens the deaerator high liquid level control valve 605 to release condensate via the condensate conduit 403 to the condensate tank 409. This reduces the condensate inflow to the deaerator 404.

The deaerator pressure corresponds to the turbine extracted steam pressure during plant operation at load. However, during plant shutdown, the deaerator pressure is kept at about 0.5 kg/cm$^2$ by the residual steam in the drum 203 of boiler 200 to prevent air leak into the deaerator 404 seeping through the flange or other part because of the drop of the deaerator pressure to a subatmospheric level caused by spontaneous heat dissipation of the deaerator 404 when the plant is shut down for about a day. The deaerator pressure is controlled such that a deaerator pressure detector 608 detects the deaerator pressure and generates a control signal to adjust the opening of a deaerator pressure control valve 607, to keep the deaerator pressure constant. At plant start-up, steam supplied via the other unit auxiliary steam conduit 502 is supplied to the deaerator 404 after reducing its pressure by the deaerator pressure control valve 607 to heat and deaerate make-up water by the deaerator 404 prior to generation of steam by the boiler 200. After steam is generated by the boiler 200, such steam is treated as described hereinabove and supplied to the deaerator 404 in place of the steam from the other unit.

The drum 203 of boiler 200 mounts a drum blowoff valve 206 for keeping constant the quality of water in the drum by blowing off steam via a drain. The main steam conduit 301 mounts a main steam conduit blowoff valve 304 for warming the main steam conduit.

Figure 3:
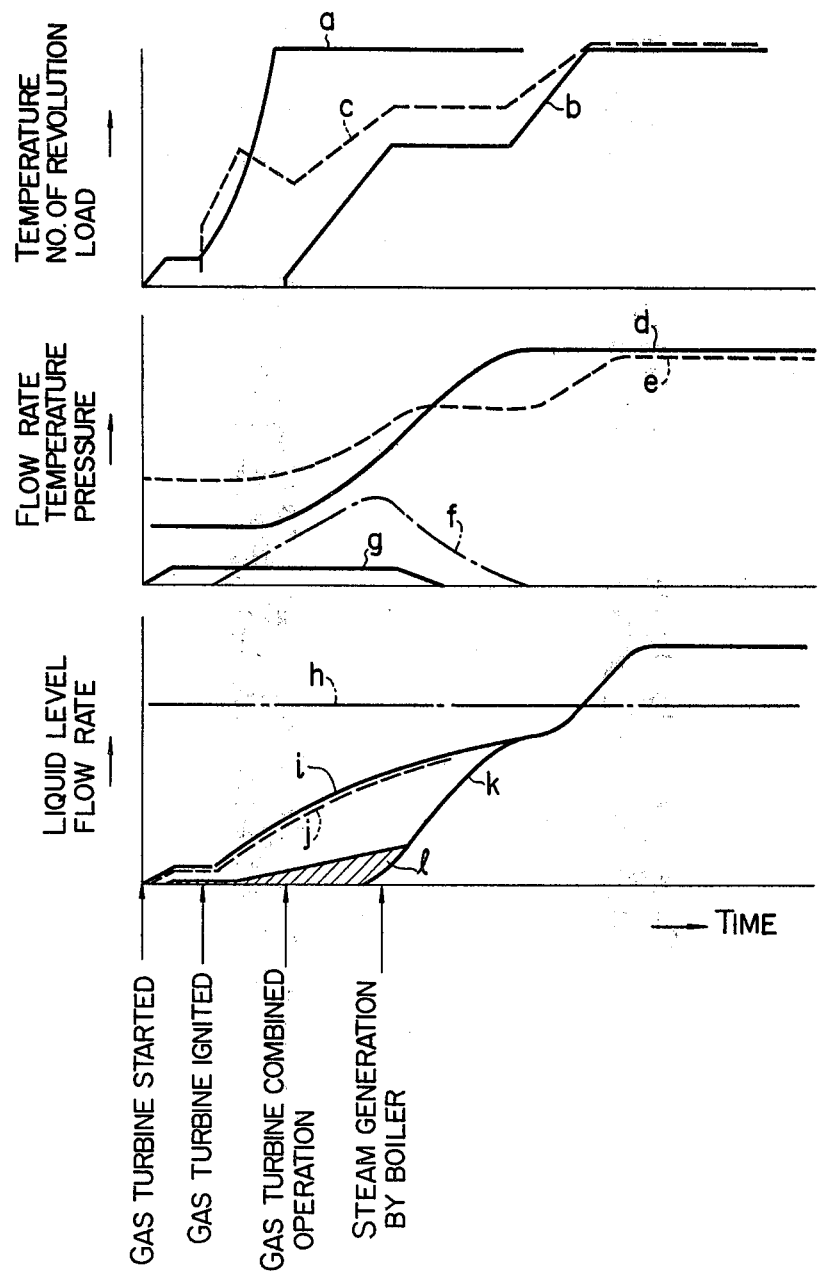
FIG. 3 is a diagram showing the plant start-up characteristics of the prior art.

The defects of the prior art for controlling the combined plant shown in FIG. 1 by the control system shown in FIG. 2 will now be discussed. FIG. 3 shows various plant start-up characteristics wherein changes in main steam pressure and main steam temperature, which will be caused by a rise in gas turbine exhaust temperature represented by a curve c when the gas turbine is started as indicated by curves a and b by a usual starting process, are represented by curves d and e respectively. To attain these characteristics, it is necessary to blow off steam via the main steam conduit blowoff valve 304 for warming the main steam conduit 301 at plant start-up, to blow off steam (curve g) via the drum blowoff valve 206 to keep constant the quality of water and to blow off water (curve f) via the fuel economizer water blowoff line 503. To compensate for the steam or water blownoff as aforesaid, it is necessary to supply feed water (curve i) to the boiler 200 prior to generation of main steam (curve k). Supply of feed water to the boiler 200 reduces the deaerator liquid level. Thus condensate is fed (curve j) to the deaerator 404 by opening the deaerator low liquid level control valve 604 to rise the condenser liquid level to open the condenser liquid level control valve 602, to keep the deaerator liquid level constant (curve h). The condensate inflow to the deaerator 404 is high in oxygen content which is markedly increased unless the condenser 401 is kept evacuated during plant shutdown. Thus it is necessary to heat and deaerate the condensate inflow to the deaerator 404. However, the deaerator 404 is heated as indicated by a hatched region l by auxiliary steam from the other unit or the auxiliary boiler until steam can be supplied to the deaerator 404 from the boiler 200. Therefore, in plants where start-and-stop is repeated many times, it is essential that means be provided for obtaining auxiliary steam from other unit or the auxiliary boiler. Thus the prior art has the disadvantages that a daily start-stop plant should be situated in a locality where other unit is operating at all times, that capital investments of such plant are increased because of the need to provide an auxiliary boiler in the absence of a constantly operating other unit in the neighborhood, and that the operation of the auxiliary boiler prior to plant start-up increases the plant start-up time including the auxiliary boiler start-up time.

Figure 4:
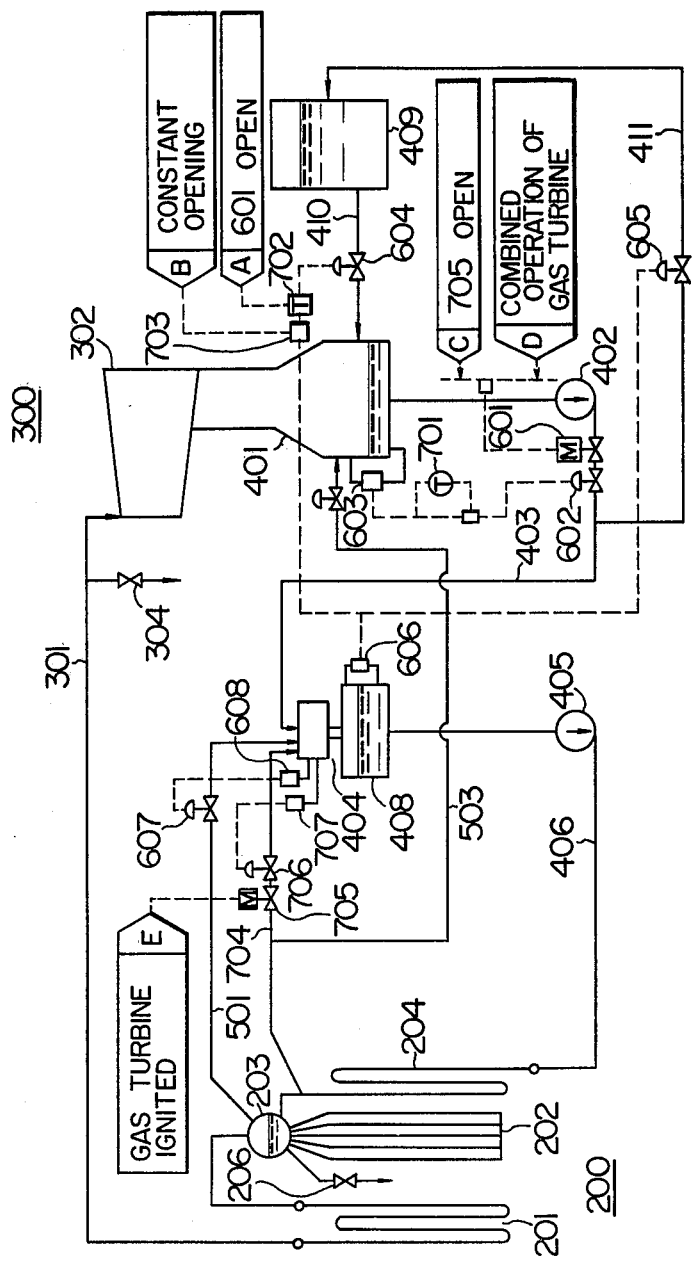
FIG. 4 is a systematic diagram of the control system for a combined plant comprising one embodiment of the present invention.

FIG. 4 shows a control system according to the invention for controlling the condenser liquid level, deaerator liquid level and deaerator pressure in a combined plant. The majority of parts shown in FIG. 4 are similar to those shown in FIG. 2 so that the distinctions between the two figures will be described.

In the control system shown in FIG. 4, control of the condenser liquid level is effected by controlling the condenser liquid level control valve 602 by means of the condenser liquid level detector 603 as in the control system shown in FIG. 2. When this control system is used, the condenser liquid level control valve 602 is open if the condenser liquid level rises during plant shutdown, so that a large quantity of condensate will temporarily flow to the deaerator 404 when the condenser liquid level control front valve 601 is opened at plant start-up. This might give rise to overloading of condensate pump 402 and inability of deaerator 404 to function satisfactorily. To avoid this trouble, there is provided tracking means 701 for tracking preset liquid level for the condenser liquid level control valve 602 in accordance with the actual liquid level detected by the condenser liquid level detector 603, to prevent valve 602 from being fully opened.

In the control system shown in FIG. 4, control of the deaerator liquid level is effected by controlling the deaerator low liquid level control valve 604 and deaerator high liquid level control valve 605 by means of the deaerator liquid level detector 605 as in the control system shown in FIG. 2. According to our invention, the deaerator 404 is heated by the steam or hot water produced by the boiler 200 at plant start-up and the deaerator low liquid level control valve 604 does not allow feeding of condensate to the deaerator 404 until the latter begins to perform a deaerating function. During this period, make-up water is fed to the boiler 200 from a deaerator water tank 408. Because of this, a reduction in the liquid level in the deaerator water tank 408 causes condensate to be supplied from the condensate tank 409 to the condenser 401, thereby raising the liquid level in the condenser 401. To avoid this trouble, the deaerator low liquid level control valve 604 is controlled by a signal A supplied to a switch 702 to open the condenser liquid level control front valve 601, when feeding of condensate to the deaerator 404 is initiated. To prevent the deaerator low liquid level control valve 604 from being fully opened as a result of a reduction in the deaerator liquid level, a signal B is supplied to an adjuster 703 to keep the opening of valve 604 constant, to feed a given quantity of water to the condenser 401 and then to feed water from the condenser 401 to the deaerator 404. Also, the condenser liquid level control front valve 601 is opened when a signal C for opening a fuel economizer-deaerator water recovery control front valve 705 and a signal D for gas turbine combined operation are generated, so that the condenser liquid level control front valve 601 will feed condensate to the deaerator 404 when the latter begins to perform a deaerating function as a result of fuel economizer-deaerator water recovery.

In addition to effecting control of the deaerator pressure by means of the deaerator pressure control valve 607 mounted in the auxiliary steam conduit 501 connecting the boiler 200 to the deaerator 404 as is the case with the control system shown in FIG. 2, the control system shown in FIG. 4 provides a fuel-economizer-deaerator water recovery line 704 for recovering a portion of the water at the outlet of the fuel economizer 204 of boiler 200, which can be extracted earlier than the steam generated by the boiler 200 at plant start-up, to the deaerator 404, and a fuel economizer-deaerator water recovery control valve 706 mounted in the line 704 is controlled by the deaerator pressure detector 707 to maintain the deaerator pressure constant. The fuel economizer deaerator water recovery control front valve 705 is opened by a signal E for igniting the gas turbine so as to recover hot water from the fuel economizer 204 to the deaerator 404 to heat and deaerate the water.

FIG. 5 shows the plant start-up characteristics of the control system shown in FIG. 4. A method of control for plant start-up according to the invention will be described by referring to FIGS. 4 and 5.

In a daily start-stop plant, the deaerator 404 has its pressure level sealed at 0.5 kg/cm$^5$ by the residual steam in the drum 203 to keep the level of deaerated water in the deaerator water tank 408 constant. The gas turbine start-up characteristics (curves a and b), gas turbine exhaust temperature characteristics (curve c) and main steam pressure and temperature characteristics (curves d and e) shown in FIG. 5 are similar to those shown in FIG. 3.

Following plant start-up, steam blowoff from the main steam conduit and steam blowoff from the drum (curve g) and water blowoff from the fuel economizer (curve f) are initiated, and the liquid level in the deaerator water tank (curve h) drops. However, the condenser liquid level control front valve 601 and deaerator low liquid level control valve 604 are fully closed, to prevent make-up water and feed water from being supplied to the condenser 401 and deaerator 404 respectively. Because of this, make-up water is supplied to the boiler 200 from the deaerator water tank 408 containing deaerated water of low oxygen content due to sealing by the residual steam in the drum 203 as aforesaid, to feed a quantity of water (curve i) necessary for the steam blowoff. Igniting of the gas turbine 102 opens the fuel economizer-deaerator water recovery control front valve 705, and the water at the outlet of fuel economizer 204 has its temperature raised following the ignition of the gas turbine. The hot water is recovered from the fuel economizer 204 to the deaerator 404 to deaerate the water by steam obtained by flushing of the hot water (the amount of recovered water is shown by a hatched region m). About this time, combined operation of the gas turbine is initiated and the condenser liquid level control front valve 601 is opened, and thereafter the deaerator low liquid level control valve 604 is controlled to a constant opening. The make-up water fed from the condensate tank 409 to the condenser 401 through the valve 604 controlled to the constant opening is increased over the quantity of the blowoff of steam and water after combined operation of the gas turbine 102 is initiated, because the lowered deaerator liquid level should return to the original level. When the condenser liquid level control front valve 601 is opened, the condenser liquid level control valve 602 is not fully opened and does not allow a large quantity of condensate to be fed to the deaerator 404, because the present liquid level for the condenser liquid level detector 603 has been tracked and set to the condenser liquid level set for initiating feeding of condensate to the deaerator 404, even when the condenser liquid level is high. Thus the deaerator low liquid level control valve 604 is opened by a constant opening signal to supply make-up water in a given quantity from the condensate tank 409 to the deaerator 404. Initiation of feeding of the make-up water to the deaerator 404 causes the internal pressure of the deaerator 404 to drop. To avoid this trouble, the fuel economizer-deaerator water recovery control valve 706 is opened by the deaerator pressure detector 707 to control the deaerator pressure to a constant level and at the same time heat and deaerate the water in the deaerator 404 by the steam produced by flushing the hot water at the outlet of the fuel economizer 204. A deaerator pressure detector 608 for the auxiliary steam pressure control valve 607 for controlling the pressure of auxiliary steam from the drum 203 is set at a pressure level slightly higher than the pressure level at which the deaerator pressure detector 707 for the fuel economizer-deaerator water recovery control valve 706, so that the hot water at the outlet of the fuel economizer 204 will be preferentially recovered.

After the deaerator liquid level is restored to its original level by the aforesaid plant operation and control process, tracking of the preset level for the condenser liquid level control valve 602 is released, and control of the deaerator low liquid level control valve 604 to a constant opening is also released, so that the plant system is controlled by a usual control circuit. The timing for initiation of control by the usual control circuit is determined by using a timer or by detecting the deaerator liquid level.

By using the method of control according to the invention described hereinabove, it is possible to minimize the oxygen content of feed water to the boiler of a daily start-stop plant at start-up, without using auxiliary steam from other unit or an auxiliary boiler, to thereby prevent corrosion of the boiler tubes. The recovery of water from the fuel economizer to the deaerator enables heat to be recovered to thereby reduce start-up losses and increase plant efficiency at low load. When the condenser is not evacuated at plant start-up, the blowoff of water from the fuel economizer could not be recovered to the condenser and should be released from the cycle, if no recovery of water from the fuel economizer to the deaerator were established. That is, recovery of blowoff water from the fuel economizer to the deaerator reduces the amount of blowoff water from the cycle.

The invention has been described with reference to an embodiment wherein the method of control is applied to a combined plant including a gas turbine and a steam turbine. However, it is to be understood that the method of control according to the invention can have application in an ordinary fossil-fuel plant including a boiler and a steam turbine with the same results, and that it can also be applied to a plant having no fuel economizer water recovery system by controlling the auxiliary steam pressure control valve for the auxiliary steam from the drum to the deaerator in the same manner as the fuel economizer-deaerator water recovery control valve. When control is effected by means of the auxiliary steam pressure control valve, it is necessary to increase the amount of water held in the deaerator because generation of steam in the drum lags behind recovery of the water from the outlet of the fuel economizer to the deaerator.

What is claimed is:

1. A method of controlling a condensation system of a steam plant wherein a steam system comprises a boiler, a load doing work with steam generated by the boiler, and a condenser for condensing steam that has done work to produce condensate, and the condensation system comprises a deaerator for heating and deaerating the condensate by at least a portion of steam or hot water obtained from the steam system, and a feed water pump for feeding the deaerated condensate to the boiler, such method comprising the steps of:

starting the boiler by feeding thereto water retained in a deaerator water tank attached to the deaerator and storing the condensate returned through the boiler in at least one of the condenser and a condensate tank to cease the feeding of the condensate to the deaerator at plant start-up; and feeding the condensate from the condenser and the condensate tank to the deaerator only after a predetermined level of deaerating function of the deaerator is ensured by using the steam and hot water produced by the boiler.

2. A method as claimed in claim 1, wherein the liquid level in the deaerator water tank is below the minimum liquid level for normal plant operation and a constant quantity of water is fed from the condensate tank to the deaerator when feeding of water to the deaerator is initiated.

3. A method as claimed in claim 1, wherein the boiler generates steam by exhaust gases of a gas turbine, and wherein at least a portion of the water at the outlet of a fuel economizer of the boiler is fed to the deaerator to increase the deaerating function of the deaerator quickly at plant start-up.

4. A method as claimed in claim 3, wherein the quantity of water fed from the fuel economizer to the deaerator is controlled by the pressure in the deaerator.

* * * * *